Sept. 17, 1957 G. M. GURLEY ET AL 2,806,412

MEANS FOR SENSING AND CORRECTING WEB CURLING

Filed Dec. 30, 1954 4 Sheets-Sheet 1

INVENTORS
FRED M. CARROLL
GREY M. GURLEY
BY P. G. Henninger
ATTORNEY

INVENTOR.
FRED M. CARROLL
GREY M. GURLEY
BY
[signature]
ATTORNEY

MEANS FOR SENSING AND CORRECTING WEB CURLING

Filed Dec. 30, 1954 4 Sheets-Sheet 3

INVENTORS:
FRED M. CARROLL
GREY M. GURLEY

BY [signature]

ATTORNEY.

MEANS FOR SENSING AND CORRECTING WEB CURLING

Filed Dec. 30, 1954 4 Sheets-Sheet 4

INVENTORS:
FRED M. CARROLL
GREY M. GURLEY
BY
[signature]
ATTORNEY.

United States Patent Office 2,806,412

Patented Sept. 17, 1957

2,806,412

MEANS FOR SENSING AND CORRECTING WEB CURLING

Grey M. Gurley, Endwell, and Fred M. Carroll, Binghamton, N. Y., assignors to International Business Machines Corporation, New York, N. Y., a corporation of New York Application December 30, 1954, Serial No. 478,668

9 Claims. (Cl. 92—70)

This invention relates to sensing means in the roller printing of tabulating cards and, more particularly, to sensing means for detecting the curling of the printed web in the printing of tabulating cards.

Tabulating cards are roller printed in a roller printing apparatus which imprints on the surface of the cards and then deposits the cards on a means for drying the cards before stacking and finally deposits the cards in a card stacker. In the roller printing of the tabulating cards, the print is impressed on a web of paper or other suitable material composing tabulating cards. The web is moved through the printing apparatus at a high rate of speed by a series of rollers. In passing the tabulating cards cut from the printed web to the drying apparatus after the completion of the printing, it is important to insure the correct alignment or straightness of the cards.

It is an object of this invention to provide a device for indicating a disalignment of the printed paper in a tabulating card printing apparatus.

It is a further object of this invention to provide a straightness sensing mechanism which polices the alignment of tabulating cards after printing and cutting and prior to drying.

It is a still further object of this invention to provide a paper straightness sensing mechanism which tests the straightness and alignment of the printed web issuing from an apparatus for imprinting tabulating cards.

Still another object of this invention is to provide a paper straightness sensing mechanism, in combination with a paper straightener which combines to monitor and control the alignment and straightness of the printed web and the printed cards in an apparatus for printing tabulating cards.

A still further object of this invention is to provide a paper straightness sensing mechanism in a tabulating card printing apparatus which is simple in its arrangement of parts and easily adaptable to the operation of present existing tabulating card printing apparatus.

These and other objects of this invention will become more apparent upon consideration of the following description, taken together with the accompanying drawings, in which.

This invention provides a means for constantly testing the straightness of the printed web from a tabulating card printing apparatus. In general, the invention provides a sensing or feeler apparatus which is constantly operated to test the shape of the printed web and the cards cut therefrom as the cards issue from the printing step in the printing apparatus. To translate the information detected by the feeler device, this invention provides linkages which are connected to suitable paper straightening means.

Figure 1:
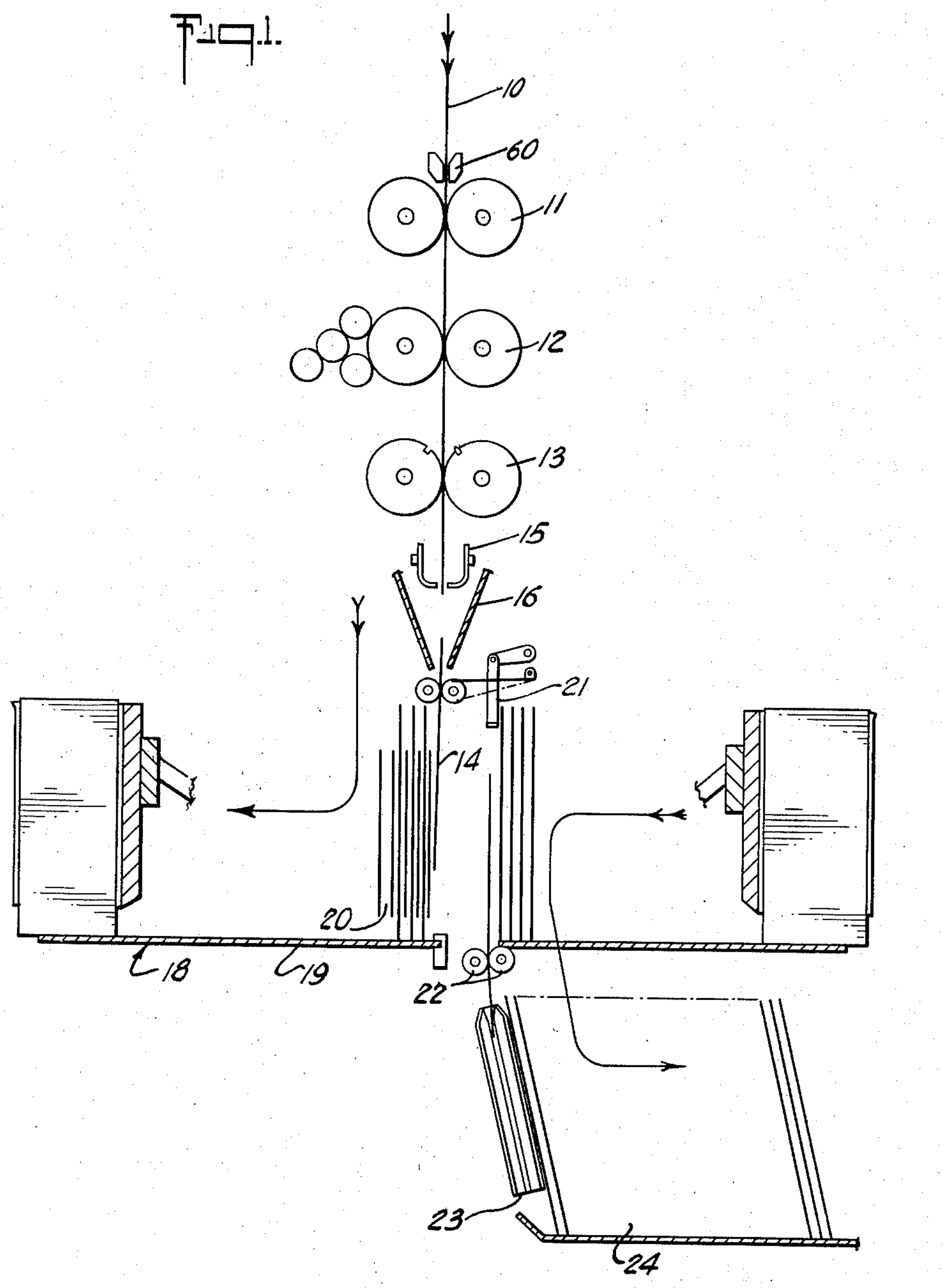
Fig. 1 is a diagrammatic front elevation of a portion of a tabulating card printing apparatus showing the apparatus for the final steps in the printing of tabulating cards.

Referring to the figures, Fig. 1 shows the apparatus for the final steps in the printing of tabulating cards. The main steps of gravure printing and back printing on the web of the apparatus are not shown. It will be understood that a web of paper 10 is fed into a printing apparatus from web rolls not shown and led through a number of printing steps to be fed to a pair of master feed rolls 11. The web 10 then passes to face printing rolls 12 which finish the printing operation and then to cut off rolls 13 which chop the web 10 into cards 14. The cut cards 14 pass between paper straightening sensing mechanism 15 of this invention and between fixed guides 16 to entry rolls 17. The entry rolls 17 control the feeding of the newly printed cards to a drying wheel 18 which is provided with a card support table 19 and a series of vertical grooves 20 which carry the cut cards 14 on the drying wheel. The cards 14 are moved by the rotation of the drying wheel by means of a drying wheel drive mechanism, not shown. The drying wheel is rotated through a drying stage and the cards 14 move almost completely through a circle. At the approach to the point of deposition on a card support table, the cards fall off the end of the support table and are ejected from the drying wheel to a card stacker by an exit pusher 21 through exit feed rolls 22. The card is sent from the exit feed rolls to fluted tubes 23 in a card stacker 24. Each of the fluted tubes is made up of a rotating cylinder having grooves and fluting and constantly rotates on its axis. The cards 14 dropping into the grooves of the fluted tubes 23 are ejected onto the stacking table where they are stacked up as finished.

In the feed of the web 10 through the printing mechanism, the rollers are geared to cause the web 10 to be drawn through the mechanism without any tendency for slack to develop between the rollers. It will be readily appreciated that it is important not to permit the slack of the web 10 to belly away from the straight intended path. This invention is directed to assuring the maintenance of straightness of the paper web particularly after the web has been cut into cards and is being moved from the printing apparatus proper to the drying wheel 18. Accordingly, the straightness sensing mechanism of this invention is positioned at the point where cards first issue from the printing mechanism.

Figure 2:
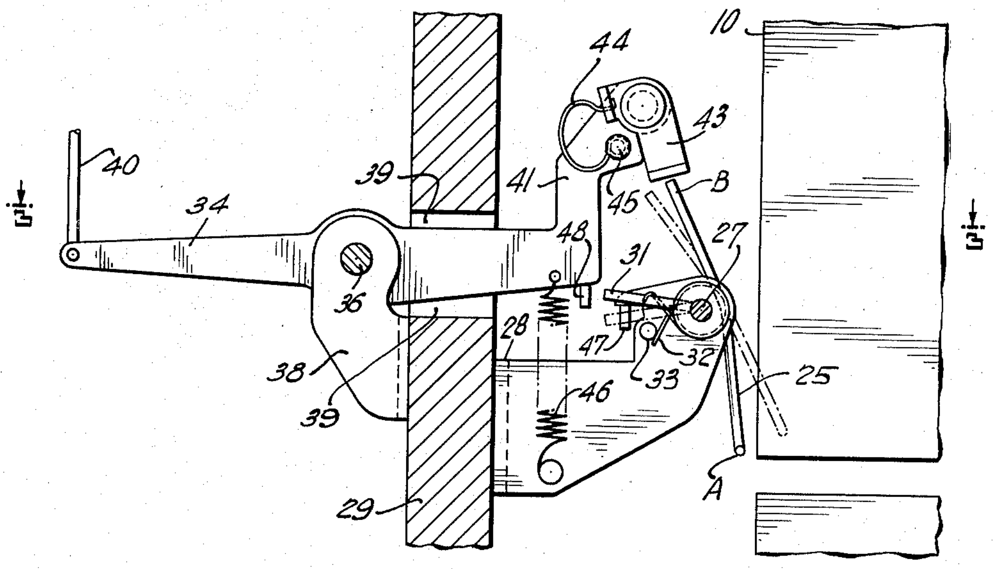
Fig. 2 is a side elevation partly in section of the paper straightness sensing mechanism for the tabulating printing apparatus shown in Fig. 1.

The sensing means 15 is provided with a pair of feelers 25 such as shown in Fig. 2.

Figure 3:
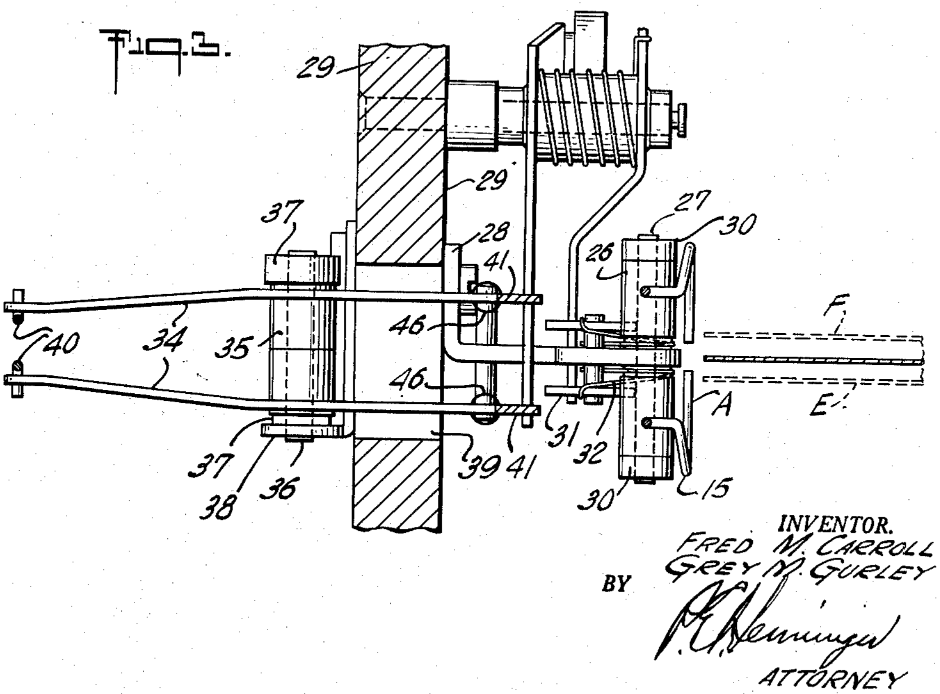
Fig. 3 is a plan view partly in section taken on line 3—3 of Fig. 2.

As will be seen in Fig. 3, the wire feelers extend on either face toward the center of the cards 14. The feelers 25 are mounted each on a rotatable hub 26 which turn on a shaft 27. The shaft 27 in turn is mounted in a bracket 28 which is suitably fastened to a supporting wall 29. The sleeves 26 are each retained on the shaft 27 by a collar 30 at the respective ends of the shaft 27. Each hub 26 has projected therefrom an arm 31 which is engaged by a loop and hook spring 32. Each of the loop and hook springs 32 has one end looped over its respective arm 31 and the other end engaged under a pin 33 which projects laterally through the bracket 28 parallel to the axis of shaft 27. The springs 32 are wound around the shaft 27 on their respective sides of the bracket 28, The action of the springs 32 on the arms 31 is to bias the hubs 26 with the lower ends A of the feelers 25 projecting outward from the bracket 28 to the position shown in dotted lines in Fig. 2. In this position the arms 31 are depressed in the position shown in dotted lines in Fig. 2.

Figure 4:
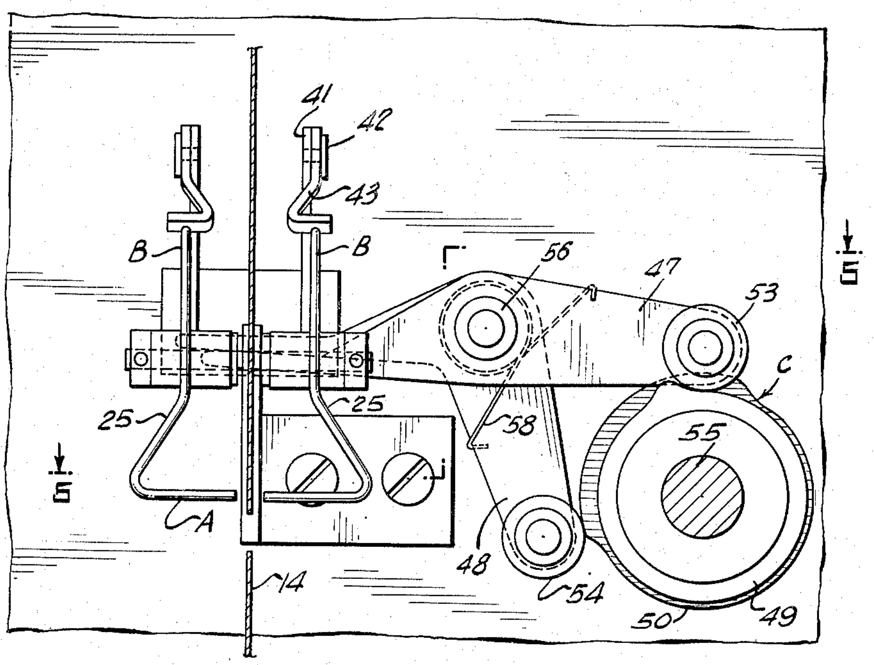
Fig. 4 is a front elevation partly in section of the mechanism of Fig. 1.

The feelers 25 have associated therewith a pair of levers 34 each having a centrally positioned sleeve 35 which turns on a shaft 36. The sleeves 35 are retained on the shaft 36 by collars 37 at the two ends of the shaft 36. The shaft 36 in turn is supported on the support wall 29 by a bracket 38. The levers 34 extend through an aperture 39 in the wall 29 and at one end are each connected to a link 40. This is the end of the levers 34 most removed from the feelers 25. On the end of the levers 34 more adjacent the feelers 25, there is provided means for carrying feeler engagement members. Each of the levers 34 has a head 41 on which a pintle 42 reciprocably attaches a dog 43 (Fig. 4). The dog 43 on each lever 34 is under the influence of semi-circular springs 44 as shown in Fig. 2. The springs 44 bias each dog 43 in a clockwise direction causing it to normally abut against the edge of head 41.

A spiral tension spring 46 between the levers 34 and the bracket 28 causes each of the levers 34 to normally be drawn downward on the end most adjacent the feelers 25. In normal position under the bias influence of the springs 32, 44 and 46, the feelers 25 are drawn with their lower ends A in an overlapping position with passage of the end of the web. Each lever 34 is biased in a downward position bringing its respective dog 43 into contact with the upper end B of the respective wire feeler 25. Thus the feelers 25 are caused to project outward at the lower end A and away from the bracket 28 to an overlapping position with the end of the web 10 protruding from the cut-off rolls 13. The feeler 25 will remain in this position unless further action is taken to move the sleeve 26 and the feeler 25. Similarly, the levers 34 will remain with the inner ends depressed unless the action of the tension spring 46 is overcome to move dogs 43 out of contact with their respective feelers 25.

A cam arm 47 is operable to raise the cam arm 31 and counteract the biasing effect of the loop and hook spring 32. Consequently, a cam arm 48 is operable to lift the inner end of either lever 34 and to overcome the action of the spring 46 thereon. In Fig. 2 the arms 47 and 48 are shown in operating position with the lever 15 and the arm 31 raised to counteract the effect of the springs and allow the feeler 25 shown in the drawing to be rotated so as not to overlap the end of the web 10.

Figure 5:
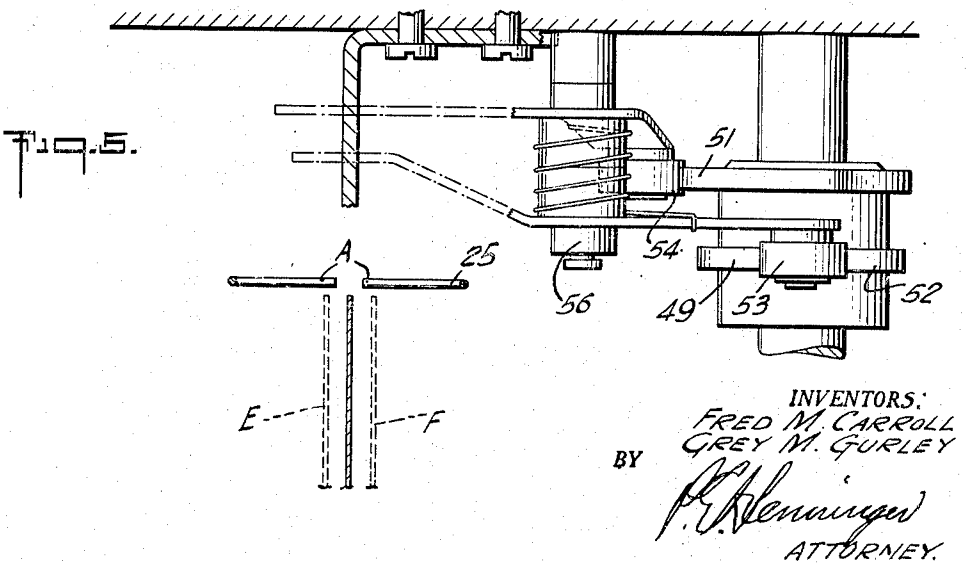
Fig. 5 is a plan view partly in section taken on line 5—5 of Fig. 4.

The mechanism for operating the cam arms 47 and 48 is shown in Figs. 4 and 5. In Fig. 4 a front elevation is shown of the straightness sensing mechanism 15. The feelers 25 are shown each projecting inward toward the card 14 from each side thereof.

The wire feelers 25, as shown in this figure and in Fig. 5, are in the non-overlapping position and the cam arm 48 is in the lever 34 engaging position while at the same time the cam arm 47 is in the arm 31 engaging position. Referring again to Fig. 2, it will be seen that this arrangement of the cam arms 47 and 48 causes the dog 43 to be disengaged from its respective feeler 25, while at the same time the feeler 25 is drawn into an inner or non-overlapping position. As shown in Figs. 4 and 5, the respective cam arms 47 and 48 are actuated by rotary cams 49 and 50, respectively. The cams 49 and 50 have respective cam surfaces 51 and 52 which engage respective cam followers 53 and 54 on the adjacent ends of the cam arms 47 and 48, respectively. The cams 49 and 50 are mounted on a rotatable cam shaft 55. The cam shaft 55 rotates the cams and induces reciprocal movement in the cam arms 47 and 48.

The cams 49 and 50 are mounted on the common shaft 55 which rotates them simultaneously. With the rotation of the shaft 55 the cam follower 54 moves across the working surface of the cam 50 and the cam follower 53 moves across the working surface of the cam 49.

As the end of the web 14 passes the lower end A of the feelers 25, as shown in the positioning of the parts of Fig. 2, the cam follower 53 is raised by the eccentric on the cam surface 52. The raising of the cam follower 53 causes tilting of the arm 47, so that the end of the arm 47 of the feelers moves from the position shown in Fig. 2. This downward movement of arm 47 causes arm 31 also to move down, rotating the hubs 26 in a counterclockwise direction as seen in Fig. 2. In Fig. 2 the hubs 26 are not seen behind the collars 30. The counterclockwise motion of the hubs 26 moves the feelers 25, so that their lower ends A move horizontally into the path of the web 10. At the same time, the upper ends B of the feelers 25 are moved downwardly, so that the feeler 25 assumes substantially the position shown in dotted lines in Fig. 2. The motion of the hubs 26 and the feelers 25 is brought about by the action of the springs 32.

When the cam follower 53 is on the cam 49 eccentric, the follower 54 passes off the high dwell of the cam 50, shown in Fig. 4. The follower 54 moves abruptly inward on the cam surface causing the end of the arm 48 at the levers 34 to drop downward as seen in Fig. 2. The springs 46 urge the ends of the levers 34 downward causing a tilting of the lever 34. If the feeler 25 is permitted to assume the dotted position by the web 10, the lever 34 will be permitted to tilt as the dog 43 will lie to the right of the upper end B of the feeler 25 in each of the respective levers 34 and dogs 43, as illustrated in Fig. 2. This action causes the respective links 40 to move upward. If, on the other hand, either of the feelers 25 is forced to remain in the solid line position of Fig. 2, then that feeler will engage its respective dog 43 when its respective lever 34 is urged to tilt by its respective spring 46. This will prevent the respective link 40 from being moved in an upwardly direction.

The continued rotation of the cam 49 returns the follower 53 to the pitch circle. As a result, the cam arm 47 is raised and the feelers 25 are restored to the home position indicated in solid lines in Fig. 2. If the lever 34 has been tilted, the return of its respective feeler 25 will bring the upper end B against the side of the dog 43. The action of the returning feeler 25 will force the dog 43 to the right and the counterclockwise motion as seen in Fig. 2 and away from the edge of head 41. This motion of the dog 43 is against the urging of the spring 44.

The cam follower 54 continues to follow the low dwell of the cam 50, as seen in Fig. 4, and the levers 34 remain in a down position if the feelers 25 have not engaged the web 10. Shortly before the next sensing cycle begins, the follower 54 reaches point C on the cam 50. The eccentric of the cam 50 rocks the cam arm 48 to cause lifting of the right ends of the levers 34, as seen in Fig. 2. At this time the respective dogs 43 are restored to their home positioning shown in Fig. 2. The purpose of the dogs 43 is to allow the feelers 25 to be restored to the solid line position of Fig. 2, when the cam follower 53 passes off the eccentric of the cam 49 while at the same time allowing the levers 34 to remain displaced in tilting condition, while the cam follower 54 traverses the cam 50 low dwell.

At this point in the operation of the apparatus of this invention, the wire feelers 25 are moving laterally of the card 14 each passing to one side of the card 14 if the web 10 is straight, so that the end of web 10 fits into a gap 59 between the adjacent but non-contiguous ends of the feelers 25. The feelers 25 of the sensing mechanism 15 are divided into two parts, that is, on each side of the tabulating card there are two independently movable feelers. These two feelers are positioned on opposite faces of the card, so that there is a feeler on each face of the card adjacent the edge of the card. If the end of web 10 is properly aligned and moving through the straightness sensing mechanism 15 in proper form, the feelers 25 will fit around the moving card 14 without touching it. On the other hand, if the card is displaced, such as by warpage or curling, to the positions indicated in the dotted lines in Figs. 3 and 5, one or the other of the feelers 25 will engage the edge of the card 14.

Referring again to Fig. 5, it is seen that a tabulating card such as card 14 may deviate from its true position in either direction to positions shown at E and F in dotted lines. This will interrupt the motion of the lower end A of the feelers 25 and inhibit further outward motion of this lower end. The feeler 25 contacting the card 14 will then be retained in substantially the position shown in Fig. 2. The respective dog 43 abutting the upper end B of this wire feeler 25 will translate this hindrance to its lever 34 and its respective link 40. The link 40 is attached to appropriate actuating means for a paper straightener 59. The paper straightener 59 exerts a corrective influence on the web 10 which is reflected into the correct alignment of successive cards 14.

Figure 6:
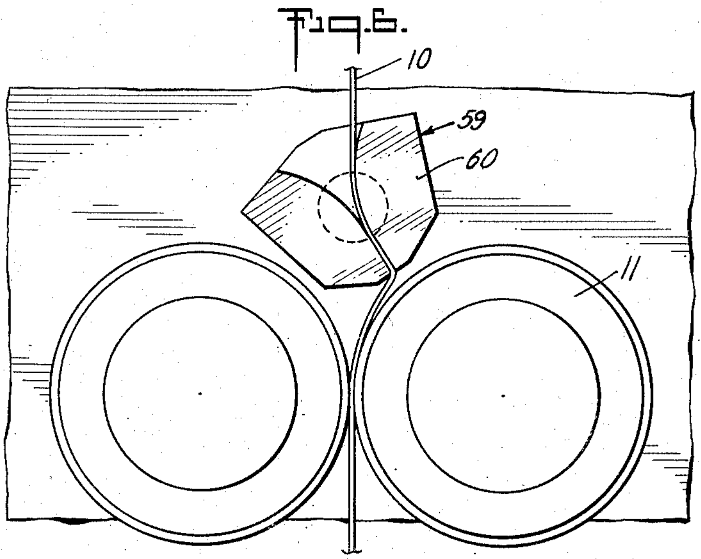
Fig. 6 is a front elevation of decurling means of the mechanism of Fig. 1.

The paper web straightener 59, as shown in Fig. 6, is composed of a pair of ironing shoes 60 which are rotatable on an axis parallel to the broad surfaces of the web 10 and extend across the web 10 lateral to its edges. The shoes 60 are alternately rotatable, normal to their respective broad web 10 surfaces, to bear against the thickness of the web 10. In thus bearing against the web 10, the shoes 60 act to stretch or smooth it and remove the warp or curl which is causing the deviation detected by the sensing mechanism 15.

Figure 7:
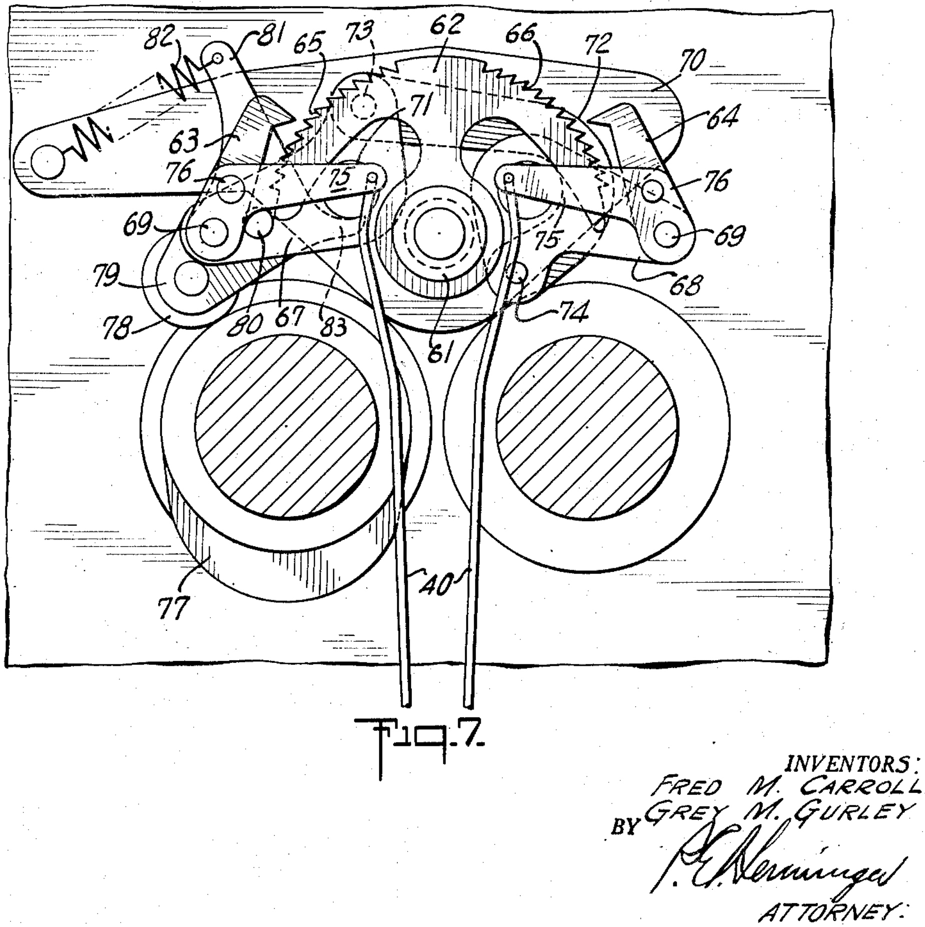
Fig. 7 is a rear elevation partly in section of the decurling unit control means.

The shoes 60 are mounted on a shaft 61. As seen in Fig. 7, the opposite end from the end on which the shoe is mounted is shown supporting a ratchet member 62. The ratchet member 62 turns with the rock shaft 61 and the shoes 60. The ratchet member 62 is operated by a pair of diametrically positioned dogs 63 and 64. The dog 63 is engageable with the left side of the ratchet member 62 and the dog 64 is engageable with the right side of the ratchet member 62. The dog 63 engages a tooth sector 65 of ratchet member 62 in which the teeth are directed to the left, as shown in Fig. 7. The dog 64 engages a tooth sector 66 of the ratchet member 62, in which the teeth are directed to the right, as shown in Fig. 7. The dogs 63 and 64 are reciprocally mounted on respective arms 67 and 68 by pins 69. The arms 67 and 68 are pivotally mounted on a sub-frame 70 by small arbors 71. The arms 67 and 68 are linked together by a fish hook link 72. The arm 67 is attached to the fish hook link 72 by a pin 73 at a point above the axis of the rock shaft 61 and to the arm 68 by a pin 74 at a point below the axis of the rock shaft 61. The linkage between the arms 67 and 68 by the link 72 causes the simultaneous movement of the arms 67 and 68 to be in opposite directions of rotation, so that the dogs 63 and 64 move upward and downward together. As the tooth sectors 65 and 66 are pointed in opposite directions, engagement of the ratchet member 62 by the dog 63 will rotate the ratchet member and the rock shaft 61 in one direction, while the engagement of the tooth sectors 66 by the dog 64 will rotate the ratchet member 62 and rock shaft 61 in the opposite direction.

The dogs 63 and 64 are each attached to one of the links 40 by a lever 75. The levers 75 are joined to their respective dogs 63 and 64 at the pins 69 and also at crank pins 76. The bell crank shape of the lever 75 causes the dogs 63 and 64 to pivot reciprocally in a lateral direction as seen in Fig. 7 upon the up and down motion of the links 40. The lateral reciprocal motion of the dogs 63 and 64 carries them in and out of engagement with their respective toothed sectors 65 and 66 on the ratchet member 62.

In operation, both dogs 63 and 64 may be considered normally engaged with their respective toothed sectors 65 and 66. When the respective feelers 25 indicate no corrective action by the paper straightener 59, both links move upward and disengage their respective dogs 63 and 64 from the ratchet member 62. When the web 10 is curled, one link 40 will move upward disengaging its respective dog 63 or 64, the other link will not move upward and its respective dog 63 or 64 will remain engaged with the ratchet member 62. A cam member 77 mounted on one of the rolls 11 engages a follower 78. The follower 78 is mounted on a cam lever 79 which is pivoted on the arm 67 at the pivot 80. An arm 81 of the lever 79 is engaged by a tension spring 82. The lever 79 has a projection 83 which bears against the left arbor 71 as seen in Fig. 7. The eccentric of the cam 77 moves the cam follower 78 to lift the lever 79 and through the pivot 80 rotates the arm 67 around its arbor 71 in a clockwise direction, as shown in Fig. 7. This rotation is translated to counterclockwise motion of the arm 68 around its arbor 71 at the fish hook lever 72. Consequently, whichever dog 63 or 64 engages the ratchet member 62 will rock the ratchet member 62 and the rock shaft 61 while the other dog is disengaged. The blocks 60 will be consequently rocked to cause the stretching or smoothing of the web 14 which removes the warp or curl. As soon as the web 14 is correctly aligned, the next sensing operation releases the engaged dogs 63 or 64 and causes the ratchet member 62 to return to a normal position straightening the blocks 60.

If the card 14 is curled to deviate to the left, as seen in Fig. 5, to the position E, the card 14 will be contacted by the left feeler 25. This contact of left feeler 25 will cause its corresponding lever 34 and link 40 to appropriately actuate suitable web straightener 59. Conversely, if the card 14 is deviated by curling or other deformation to the right to position F, the right feeler 25 as shown in Fig. 5 will contact the card 14. In such an eventuality, the right feeler 25 will operate its respective lever 34 and link 40 to appropriately actuate the web straightener 59.

The device of this invention thus detects curling or deviation from straightness in the finished tabulating cards. These deviations indicate a regularity or curling of the web material. The paper straightness sensing mechanism actuates suitable means for correcting the curl of the web.

Among the advantages of this invention is the classification of the type of curling and the actuation of a corrective operation, particularly applicable to the curling effect projected by the paper straightening sensing mechanism.

Another advantage of the mechanism of this invention is its reliable operation. This advantage, coupled with the simplicity of the mechanism provides a device which is relatively foolproof and will not be subject to breakdown.

Further advantages of the device are seen in the gentle touch applied to the tabulating cards. The feelers are contacted against tabulating cards under a spring actuated contact. Consequently, the elasticity of the contact provides both sensitivity to the detection and also avoids jamming of the printing mechanism by contact of the feelers with the card projected by the printing operation.

A still further advantage of the invention is found in the fact that the device checks the curl of the web of material at its free end without otherwise disturbing the web in making the check.

We claim:

1. In an apparatus the combination with means for forming cards from a web of sheet material, a decurling unit flexing the web while the material is feeding towards the forming means and means for feeding the web successively past the decurling unit and forming means, of gauging means for automatically governing the continued operation of the decurling unit including a pair of members separated axially by a gap, means for intermittently moving said members laterally of said web and cards into a position of contactability and means engageable with said movable members operable thereby to actuate said web curl correcting means.

2. In an apparatus for forming cards the combination with means for forming cards from a web of sheet material, a decurling unit flexing the web while the material is feeding towards the forming means and means for feeding the web and cards successively past the decurling unit and forming means, of gauging means for automatically governing the continued operation of the decurling unit including sensing means movable laterally relative to said web into an area overlapping said web, means for reciprocation of said sensing means laterally with respect to said web and means engageable with said sensing means for controlling said decurling unit.

3. In an apparatus for forming cards the combination with means for forming cards from a web of sheet material, a decurling unit flexing the web while the material is feeding towards the forming means and means for feeding the web and cards successively past the decurling unit and forming means, of gauging means for automatically governing the continued operation of the decurling unit including at least two movable straightness sensing feelers spaced and diametrically positioned, a rotatable hub separately supporting each of said straightness sensing feelers, means normally biasing said straightness sensing feelers and said rotatable hubs in an extended position, an arm normally holding said biased feelers in a retracted position, and cam means engaging said arm to allow said feelers to move to said extended position.

4. In an apparatus as claimed in claim 3, a further cam means for moving said feelers to an extended position with said first-mentioned cam means in engagement with said arm means.

5. In an apparatus for forming cards the combination with means for forming cards from a web of sheet material a decurling unit flexing the web while the material is feeding towards the forming means and means for feeding the web and cards successively past the decurling unit and forming means, of gauging means for automatically governing the continued operation of the decurling unit including a pair of rotatably mounted sensing means, springs respectively biasing said sensing means, cam controlled means holding said sensing means out of spring biased position, a cam means cooperating with said cam controlled means for releasing said spring, a projection of said sensing means engageable with said web to hold said sensing means out of biased position, an arm engageable with said sensing means in said non-spring biased position, and a link attached to said arm for actuating said decurling unit.

6. In an apparatus as claimed in claim 5, said arm composed of an L-shaped member, in combination with a pivotally mounted dog mounted on an end of said L-shaped member, an expansion spring biasing said pivotally mounted dog, a spiral spring attached to said L-shaped member drawing said dog against said sensing means.

7. In an apparatus as claimed in claim 5, a pivot point for pivotally supporting said arm in contacting said sensing means.

8. In an apparatus as claimed in claim 5, a web straightening means actuatable by said link comprising a rotatable shoe contactable with said web, and means connected to said link for rotating said shoe.

9. In an apparatus as claimed in claim 2, sensing means movable laterally relative to said web to overlap said cards.

References Cited in the file of this patent

UNITED STATES PATENTS

| | | |
|---|---|---|
| 2,070,505 | Beck | Feb. 9, 1937 |
| 2,267,175 | Skriba | Dec. 23, 1941 |
| 2,288,786 | Carroll | July 7, 1942 |